United States Patent
Jeon et al.

(10) Patent No.: US 11,080,868 B2
(45) Date of Patent: Aug. 3, 2021

(54) METHOD AND SYSTEM FOR TRACKING OBJECT OF INTEREST IN REAL-TIME IN MULTI-CAMERA ENVIRONMENT

(71) Applicant: GIST(Gwangju Institute of Science and Technology), Gwangju (KR)

(72) Inventors: Moon Gu Jeon, Gwangju (KR); Hyung Uk Choi, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 89 days.

(21) Appl. No.: 16/480,690

(22) PCT Filed: Jan. 23, 2018

(86) PCT No.: PCT/KR2018/000975
§ 371 (c)(1),
(2) Date: Jul. 25, 2019

(87) PCT Pub. No.: WO2018/135922
PCT Pub. Date: Jul. 26, 2018

(65) Prior Publication Data
US 2020/0175697 A1    Jun. 4, 2020

(30) Foreign Application Priority Data
Jan. 23, 2017 (KR) .......... 10-2017-0010702

(51) Int. Cl.
*G06T 7/292* (2017.01)
*G06T 7/246* (2017.01)

(52) U.S. Cl.
CPC .......... *G06T 7/292* (2017.01); *G06T 7/248* (2017.01); *G06T 2207/10004* (2013.01); *G06T 2207/30241* (2013.01)

(58) Field of Classification Search
CPC .......... G06T 7/292; G06T 7/248; G06T 2207/10004; G06T 2207/30241
See application file for complete search history.

(56) References Cited

U.S. PATENT DOCUMENTS

| | | | |
|---|---|---|---|
| 2011/0090344 A1* | 4/2011 | Gefen ............... | G06T 7/248 348/169 |
| 2012/0206605 A1* | 8/2012 | Buehler ........... | G08B 13/19645 348/159 |
| 2012/0243732 A1* | 9/2012 | Swaminathan ........ | G06T 7/246 382/103 |

FOREIGN PATENT DOCUMENTS

KR    10-2016-0080583 A    7/2016

OTHER PUBLICATIONS

International Search Report issued in PCT/KR2018/000975; dated May 2, 2018.

(Continued)

*Primary Examiner* — Casey L Kretzer
(74) *Attorney, Agent, or Firm* — Studebaker & Brackett PC

(57) ABSTRACT

The present disclosure relates to a method and system for tracking an object of interest in real-time in a multi-camera environment capable of performing data communication without the occurrence of overlapping, and according to the present invention, an object of interest can be tracked in real-time on the basis of mutually captured image data even though capturing zones of a plurality of cameras capable of performing data communication according to the connection therebetween are not overlapped with each other.

10 Claims, 5 Drawing Sheets

(56) References Cited

OTHER PUBLICATIONS

Kim, Jun Sik et al., "Multi Camera Tracking with Non-overlapping Cameras", KAIST Electrical Engineering, IPIU 2015 (the 27th Workshop on Image Processing and Image Understanding). Feb. 4, 2015, pp. 1-3.
Simonnet, Damien et al., "Re-identification of Pedestrians in Crowds Using Dynamic Time Warping", Digital Imaging Research Cetre, Kingston University, Kingston-upon-Thames KT12EE, Oct. 2012, pp. 423-432.

* cited by examiner

FIG. 5A

| $N_1$ | $N_2$ | $N_3$ | $N_4$ | $N_5$ | $N_6$ | $N_7$ | $N_8$ | $N_9$ | $N_{10}$ |

FIG. 5B

| A | B | C | D | E | F |
|---|---|---|---|---|---|
|   |   |   |   |   |   |
|   |   |   |   |   |   |
|   |   |   |   |   |   |
|   |   |   |   |   |   |

METHOD AND SYSTEM FOR TRACKING OBJECT OF INTEREST IN REAL-TIME IN MULTI-CAMERA ENVIRONMENT

CROSS REFERENCE TO RELATED APPLICATION

This application is a National Phase application of International Application No. PCT/KR2018/000975 filed Jan. 23, 2018, which claims benefit of priority to Korean Patent Application No. 10-2017-0010702 filed Jan. 23, 2017, the entire content of which is incorporated herein by reference.

TECHNICAL FIELD

The present invention relates to a method and system for tracking an object of interest in real-time in a multi-camera environment, and more specifically, to a method and system for tracking an object of interest in real-time in a multi-camera environment in which cameras are capable of performing data communication without overlapping each other.

BACKGROUND ART

Recently, as importance of security has increased with development of information and communications technology, in general, the information and communications technology is applied to a capturing means such as a closed-circuit television (CCTV) such that intelligent CCTV technology, in which image information can be viewed remotely in real-time anytime and anywhere by any terminal that has been qualified in advance, is becoming popular.

However, even with the conventional intelligent CCTV technology or smart remote security technology, tracking for enlarging a specific user's face, determining whether a vehicle is parked, or checking specific information of a vehicle is only possible in one CCTV (capturing means) according to a resolution of a corresponding image information. That is, because it is only possible to track an object in a single camera environment even with the intelligent CCTV technology or smart remote security technology which is widely commercialized, various studies are underway to apply an object tracking method in a multi-camera environment.

Technical Problem

The present invention, which has been recognized the limitations in the above-described commercialized technologies, is directed to providing a method and system for tracking an object of interest in real-time in a multi-camera environment.

Further, the present invention is directed to providing a method and system for tracking an object of interest in real-time in a multi-camera environment in which cameras are connected to each other via a network, are capable of performing data communication, and do not overlap each other.

Technical Solution

One aspect of the present invention provides a method for tracking an object of interest in a multi-camera environment. The method includes selecting, by a server module, a subnetwork in the multi-camera environment; receiving, by a client module, subnetwork configuration information from the server module; receiving, by the client module, image frames from one or more cameras constituting the subnetwork in a first time interval; determining a camera in which an object of interest is present on the basis of the received image frames and locally tracking the object of interest for the image frame from the determined camera; and re-identifying the object of interest of the one or more cameras constituting the subnetwork when the object of interest disappears from the image frame of the determined camera.

Further, in the present invention, the subnetwork configuration information may include an identifier (ID) of the object of interest and a camera index, and the subnetwork may include one or more cameras neighboring a reference camera in which the ID of the object of interest is expected to be present.

Meanwhile, in the method, the local tracking of the object of interest includes tracking the object of interest in a second time interval from a time when the object of interest is present on the basis of an image frame received from a first camera constituting the subnetwork and generating local path tracking information (tracklet) and interest object result information (region of interest (ROI) information).

In addition, the method according to the present invention may further include re-identifying the object of interest by comparing image frames from a first camera and a second camera constituting the subnetwork on the basis of the local path tracking information and the interest object result information, associating image frames received from the one or more cameras constituting the subnetwork with data on the basis of the local path tracking information, multi-camera topology information, and interest object similarity information when the object of interest is re-identified; generating global object tracking information and multi-camera tracking result by associating the data and transmitting the global object tracking information and the multi-camera tracking result data to the server module; and resetting, by the server module, the subnetwork on the basis of global object tracking information and the multi-camera tracking result.

Another aspect of the present invention provides a computer readable storage media recording a computer program for executing the method according to the one aspect of the present invention. Specifically, the computer program recorded in the computer readable storage media according to the another aspect of the present invention includes a code for selecting a subnetwork in a multi-camera environment, which is executed in a server module; a code for receiving subnetwork configuration information from the server module, which is executed in a client module; a code for receiving image frames from one or more cameras constituting the subnetwork in a first time interval, which is executed in the client module; a code for determining a camera in which an object of interest is present on the basis of the received image frames and locally tracking the object of interest for an image frame from the determined camera; and a code for re-identifying the object of interest of the one or more cameras constituting the subnetwork when the object of interest disappears from the image frame of the determined camera.

Still another aspect of the present invention provides a system for tracking an object of interest in a multi-camera environment. The system for tracking an object of interest includes a plurality of cameras configured to capture different zones; a server module configured to select a subnetwork of the plurality of cameras; and one or more client modules configured to perform data communication with the server module and the plurality of cameras, receive image frames from one or more cameras constituting the subnetwork in a first time interval, detect an object of interest, and track the object of interest.

In addition, the server module may reset the subnetwork on the basis of global object tracking information, multi-camera tracking result information, and multi-camera topology information. Meanwhile, the one or more client modules may include a local tracking unit configured to determine whether the object of interest is present in an image frame received from a first camera and generate local path tracking information and interest object result information in a second time interval from a time when the object of interest is present on the basis of the image frame received from the first camera; an object re-identification unit configured to re-identify the object of interest by comparing image frames from the first camera and a second camera constituting the subnetwork on the basis of the local path tracking information and the interest object result information; and a data association unit configured to associate the image frames received from the one or more cameras constituting the subnetwork with data on the basis of the local path tracking information, the multi-camera topology information, and interest object similarity information when the object of interest is re-identified.

Advantageous Effects

According to the method and system for tracking an object of interest in real-time in a multi-camera environment according to the present invention, an object of interest can be tracked in real-time on the basis of mutually captured image data even though capturing zones of a plurality of cameras capable of performing data communication according to the connection therebetween do not overlap each other.

It will be apparent to those skilled in the art that the effects of the present invention are not limited to those described above. According to the method and system for tracking an object of interest according to the present invention, a target object to be ultimately tracked by a user can be globally tracked in real-time in a multi-camera network.

BRIEF DESCRIPTION OF DRAWINGS

FIGS. 5A and 5B show configuration diagrams of examples of data variables which are transmitted and received between a server module and a client module in the method for tracking an object of interest according to the present invention.

SUMMARY

Figure 1:
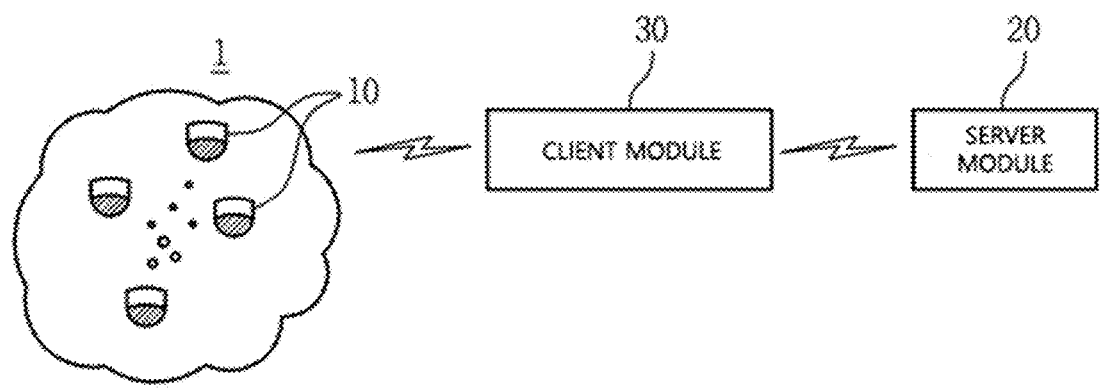
FIG. 1 is a schematic configuration diagram of a system for tracking an object of interest in a multi-camera environment according to an embodiment of the present invention.

A method for tracking an object of interest in a multi-camera environment according to the present invention, which is a method for tracking an object of interest in a multi-camera environment, the method including selecting, by a server module, a subnetwork in the multi-camera environment, receiving, by a client module, subnetwork configuration information from the server module, receiving, by the client module, image frames from one or more cameras constituting the subnetwork in a first time interval, determining a camera in which an object of interest is present on the basis of the received image frames and locally tracking the object of interest for the image frame from the determined camera, and re-identifying the object of interest of the one or more cameras constituting the subnetwork when the object of interest disappears from the image frame of the determined camera.

DETAILED DESCRIPTION

Specific structural and functional descriptions of embodiments of the present invention disclosed in this specification are only for the purpose of describing embodiments of the present invention, and the embodiments of the present invention may be embodied in various forms and should not be interpreted as being limited to the embodiments described in this specification.

While the present invention is open to various modifications and alternative forms, specific embodiments thereof are shown by way of example in the drawings and will herein be described in detail. However, it should be understood that there is no intent to limit the present invention to the particular forms disclosed, and on the contrary, the present invention is to cover all modifications, equivalents, and alternatives falling within the spirit and scope of the present invention.

The terminology used herein is for the purpose of describing particular embodiments only and is not intended to be limiting to the present invention. As used herein, the singular forms "a," "an," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

In addition, in this specification, the terms first, second, etc. are used only for the purpose of distinguishing one element from another element, and they may be understood to be compatible with each other.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a method and system for tracking an object of interest in real-time in a multi-camera environment according to the present invention will be described in detail with reference to the accompanying drawings.

Figure 2:
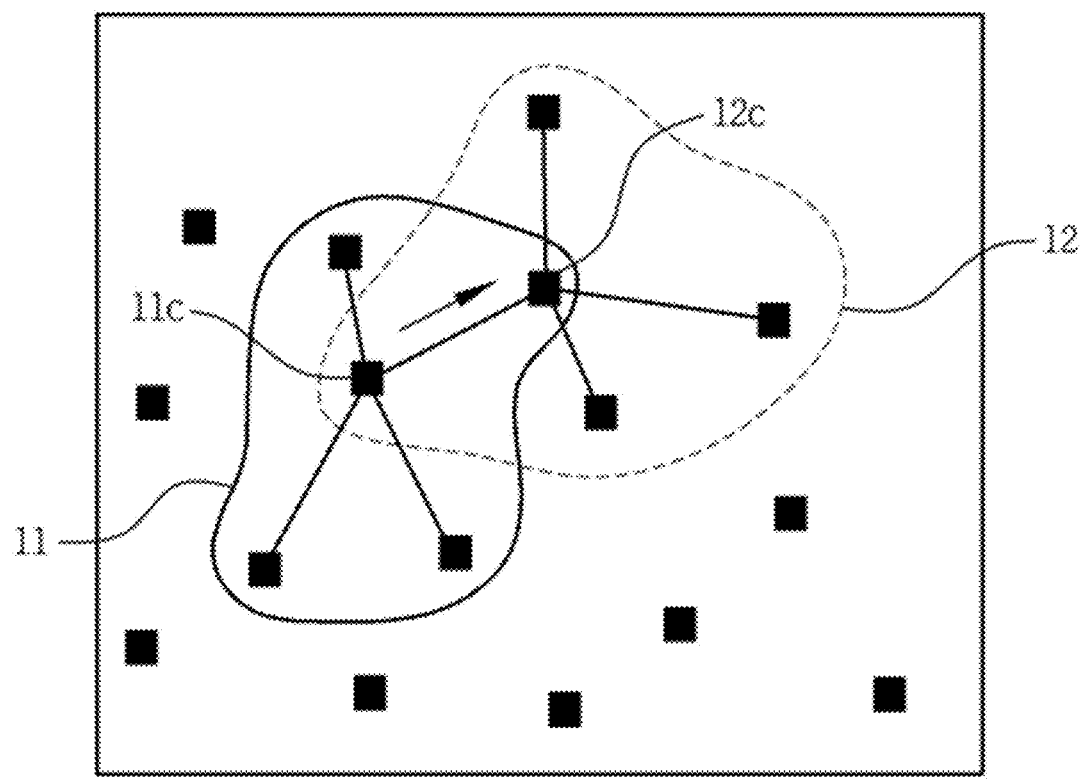
FIG. 2 is a simplified cross-sectional view for describing processes of setting and resetting a subnetwork under a multi-camera environment, which is an environment in which the present invention is applied.

FIG. 1 is a schematic configuration diagram of a system for tracking an object of interest in a multi-camera environment 1 according to an embodiment of the present invention, and FIG. 2 is a simplified cross-sectional view for describing processes of setting and resetting a subnetwork under a multi-camera environment 1, which is an environment in which the present invention is applied.

As shown in FIG. 1, the system for tracking an object of interest according to the present invention includes a plurality of cameras 10, a server module 20, and one or more client modules 30.

The plurality of cameras 10 are cameras capable of capturing images of different zones so as not to overlap each other and are collectively referred to as a unit capable of capturing image information by conventional closed-circuit televisions (CCTVs), thermal image cameras, digital cameras, infrared (IR) cameras, or the like. The method and system for tracking an object of interest according to the present invention may be applied under a multi-camera environment in which a network is set up such that the plurality of cameras 10 can perform data communication with each other.

Meanwhile, the server module 20 may select a subnetwork among the plurality of cameras 10, and the one or more client modules 30 may perform data communication with the plurality of cameras 10 and the server module 20 and receive image frames from the one or more cameras 10 constituting the subnetwork in a first time interval to detect and track the object of interest. The server module 20 and/or the client modules 30 (particularly, the client modules 30) are constituted as a plurality of modules when hardware design specifications are satisfied so that object tracking may be implemented with a plurality of cameras or a larger number of cameras at a higher resolution.

The multi-camera environment 1 in which the system for tracking an object of interest shown in FIG. 1 is applied will be described with reference to FIG. 2. In FIG. 2, it may be understood that square points refer to cameras (e.g., a CCTV) which are installed at geographically spaced locations, respectively. As described above, individual cameras may all be connected to one another in the form of a mesh network. However, in FIG. 2, an example in which a subnetwork is set up by some of overall cameras will be described.

For example, when it is expected that an object to be tracked, that is, an object of interest, is disposed at a reference numeral 11c, a first subnetwork 11 may be set or selected with cameras that are geographically adjacent to (neighboring) a camera positioned at the reference numeral 11c. In a similar aspect, when it is expected that an object to be tracked, that is, an object of interest, is positioned at a reference numeral 12c, a second subnetwork 12 may be set or selected with cameras that are geographically adjacent to (neighboring) a camera positioned at the reference numeral 12c.

The term "geographically adjacent to" or "neighboring" in the setting of the subnetwork refers to a relationship between cameras which are positioned without passing through another camera under a multi-camera environment. In other words, it may be understood that the meaning of "geographically adjacent to" or "neighboring" encompasses a path that is expected for an object of interest to appear after the object of interest disappears from any camera.

Furthermore, according to the system for tracking an object of interest according to the present invention, after the object of interest disappears from image information obtained by a first camera constituting the first subnetwork 11, when it is determined that an object which is most similar to the object of interest appears from image information obtained by another camera (a second camera, a third camera, or the like) constituting the first subnetwork 11, the subnetwork may be reset to a new subnetwork on the basis of the corresponding camera.

For example, after the object of interest which is present in the image information captured by the camera positioned at the reference numeral 11c disappears from the camera at the reference numeral 11c, when the object determined to be the same object as the object of interest is identified in the image information captured by the camera positioned at the reference numeral 12c, the subnetwork may be reset to a second subnetwork 12 on the basis of the camera positioned at the reference numeral 12c.

Figure 3:
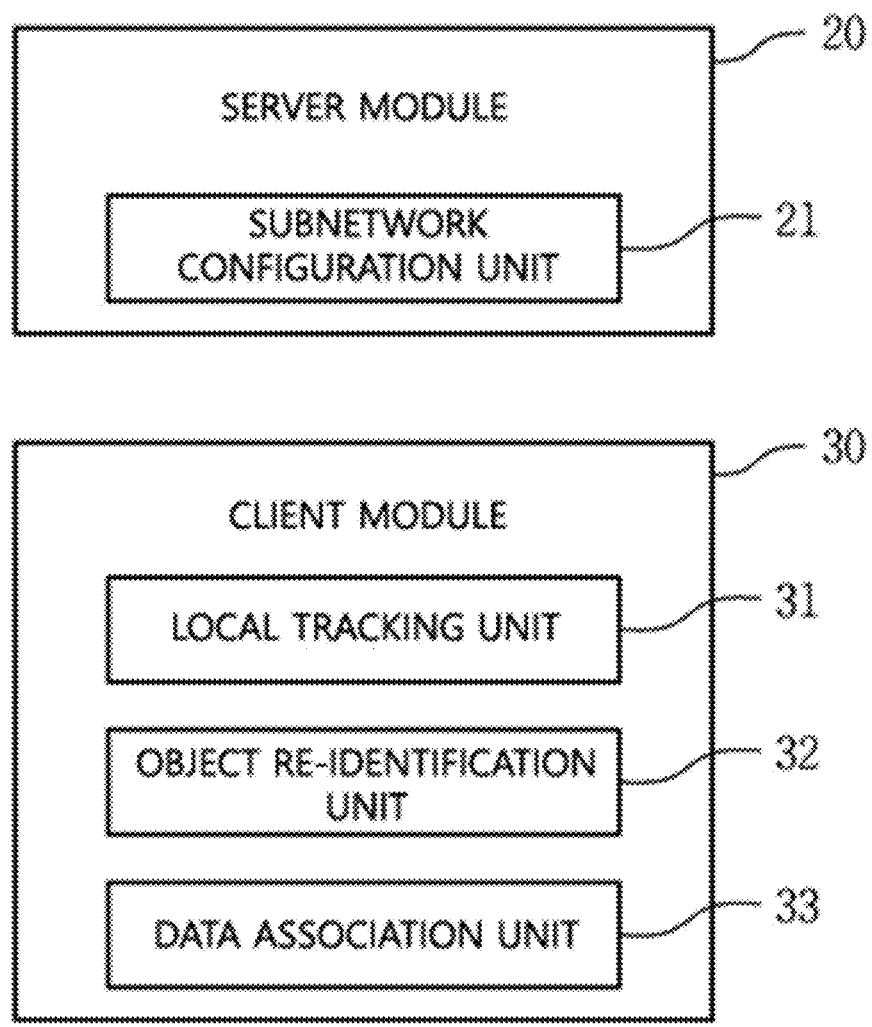
FIG. 3 is a functional diagram for describing components of a system for tracking an object of interest in a multi-camera environment according to an embodiment of the present invention.

FIG. 3 is a functional diagram for describing the server module 20 and the client module 30 among the components of the system for tracking an object of interest in a multi-camera environment according to the embodiment of the present invention. The server module 20 includes a subnetwork configuration unit 21, and the client module 30 includes a local tracking unit 31, an object re-identification unit 32, and a data association unit 33. In FIG. 3, functional configurations of the server module 20 and the client module 30 are not limited thereto, and the server module 20 and the client module 30 may be implemented including another additional functional unit as long as the unit includes the server module 20 and the client module 30.

The subnetwork configuration unit 21 of the server module 20 configures a new subnetwork on the basis of a camera that is expected to have an object of interest in a multi-camera environment or configures a new subnetwork on the basis of result information calculated in the client module 30 and geographical/physical distance intervals (multi-camera topology information) between cameras included in the multi-camera environment.

Meanwhile, in the client module 30, the local tracking unit 31 determines whether the object of interest is present in an image frame received from the first camera and generates local path tracking information and interest object result information in a second time interval from a time when the object of interest is present on the basis of the image frame received from the first camera.

The object re-identification unit 32 re-identifies the object of interest by comparing image frames from the first camera and the second camera constituting the subnetwork on the basis of the local path tracking information and the interest object result information.

The data association unit 33 associates image frames from one or more cameras constituting the subnetwork with data on the basis of the local path tracking information, the multi-camera topology information, and the interest object similarity information when the object of interest is re-identified.

Figure 4:
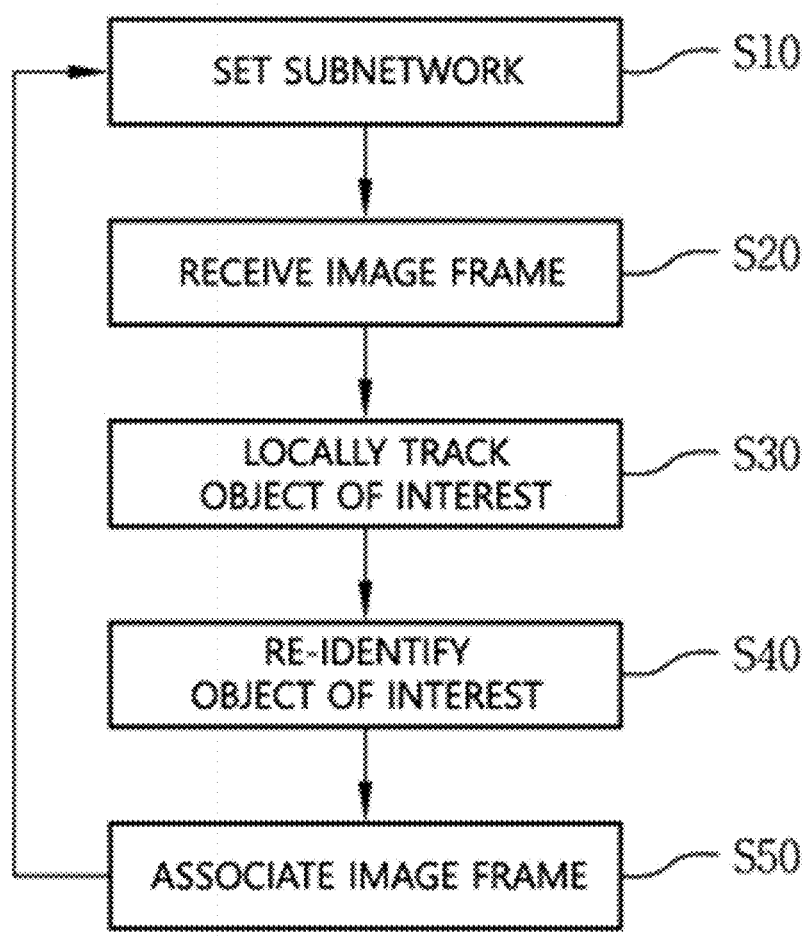
FIG. 4 is a schematic flowchart of a method for tracking an object of interest in a multi-camera environment according to an embodiment of the present invention.

FIG. 4 is a schematic flowchart of a method for tracking an object of interest in a multi-camera environment according to an embodiment of the present invention. First, a server module sets up (selects) a subnetwork in a multi-camera environment (operation S10). The subnetwork refers to a relationship between neighboring cameras around a camera at a point at which the object of interest is expected to be present (positioned) (It should be understood as a concept covering a position at which the object of interest can directly appear after the object of interest disappears from an image frame captured by any camera, as described with reference to FIG. 2).

Next, the server module transmits information about the subnetwork to a client module, and the client module receives subnetwork configuration information and receives image frames from one or more cameras constituting the subnetwork in a first time interval (operation S20).

A camera in which the object of interest is present is determined on the basis of the received image frames, and local tracking of the object of interest is performed on the image frame received from the determined camera (operation S30). In the local tracking, it is possible to identify a moving object using color information in one image frame, an image filtering technique, and the like, assign a temporary identifier (ID) to each individual object, and determine whether the corresponding object matches the object of interest or it is possible to identify the object of interest using shape comparison with a first object of interest, a color contrast, and an image filter involved in such a process.

As another example, in the local tracking of the object of interest, local path tracking information (tracklet) and interest object result information (region of interest (ROI) information) may be generated on the basis of image frames received from the first camera (the camera for which it is determined that the object of interest is present) constituting the subnetwork at a predetermined interval (it may be a different interval from the first time interval in which image frames are received from one or more cameras constituting the subnetwork) from the time when the object of interest is present. The local path tracking information is a record of a tracking path through which the corresponding object of interest moves in a process in which a single camera image changes in time, and the interest object result information may include an ID of the corresponding object of interest at a moment when the corresponding object of interest disappears from a corresponding image frame, an exterior and color of the object of interest, information of the time at which the object of interest disappears, and position information.

When the object of interest disappears from the image frame of the determined camera, re-identification of the object of interest of the one or more cameras constituting the subnetwork is performed (operation S40). The re-identification process may be performed by comparing color appearance in consideration of path estimation, motion estimation, tracklet, and the like.

When the object of interest is re-identified, the image frames from the one or more cameras constituting the subnetwork associates with data on the basis of the local path tracking information, multi-camera topology information, and interest object similarity information (operation S50), and when the data is associated, the client module generates global object tracking information and multi-camera tracking results and transmits the global object tracking information and the multi-camera tracking results to the server module.

Thereafter, the subnetwork may be reset by the server module on the basis of the global object tracking information and the multi-camera tracking results (recursive execution to operation S10).

Figures 5A, 5B:
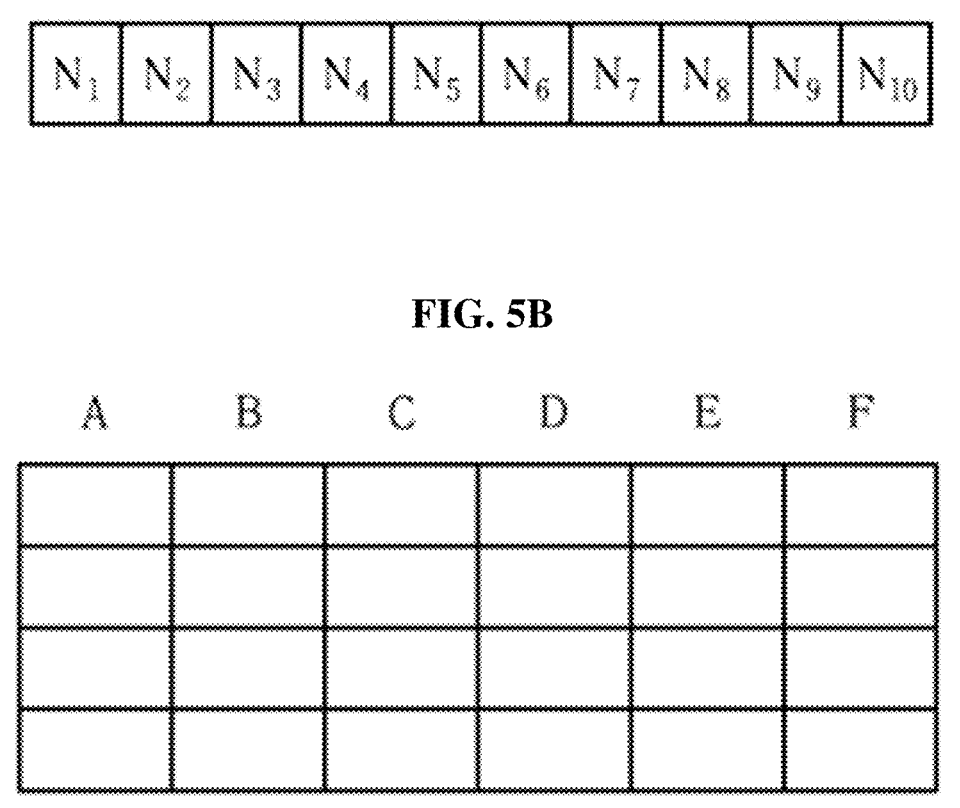

FIGS. 5A and 5B show configuration diagrams of examples of data variables which are transmitted and received between the server module and the client module in the method for tracking an object of interest according to the present invention. FIG. 5A shows data variables of subnetwork configuration information received in the client module after the subnetwork is selected or set by the server module, and FIG. 5B shows data variables of multi-camera tracking results transmitted to the server module after the tracking of the object of interest is performed by the client module.

Referring to FIG. 5A, which shows an exemplary structure of the data variables of the subnetwork configuration information, $N_1$ to $N_8$ bits store a camera index, and $N_9$ and $N_{10}$ bits store an ID of the object of interest.

Referring to FIG. 5A, which shows an exemplary structure of the data variables of the multi-camera tracking results, column A records an index of a target camera, column B records a local ID of an object of interest in the target camera, column C records an index of a camera as a next candidate target camera, and column D records a local ID of an object of interest within the next candidate target camera. Meanwhile, columns E and F record association determination result information between two objects and, for example, the column E may record re-coloring similarity information between two objects and the column F may record an association index between two objects.

Figure 6:
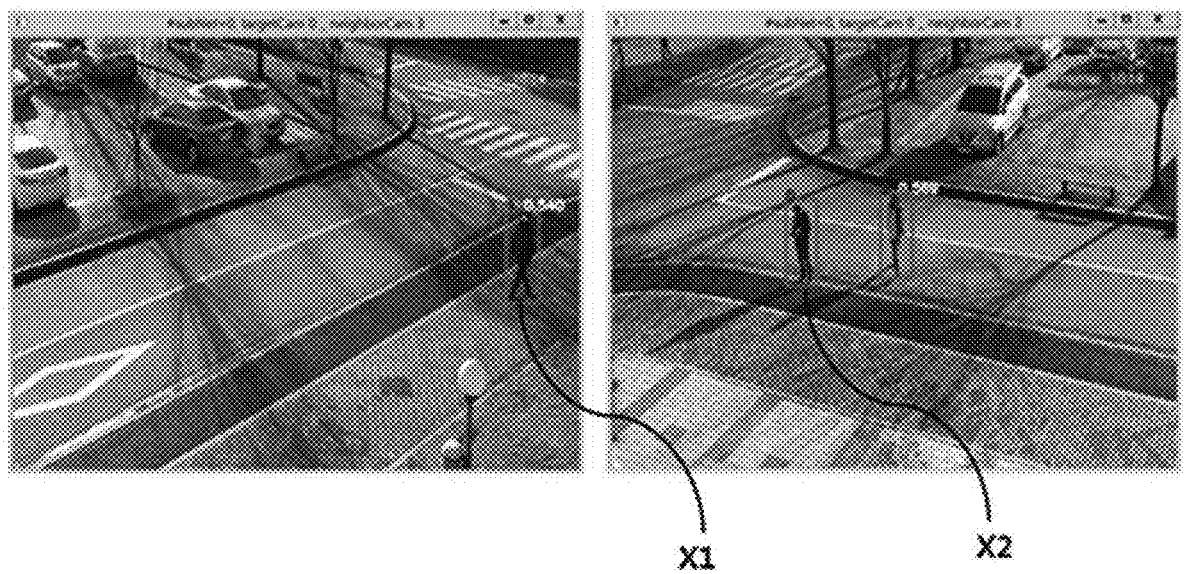
FIG. 6 shows experimental examples in which the method and system for tracking an object of interest according to the present invention are applied.

FIG. 6 shows experimental examples in which the method and system for tracking an object of interest according to the present invention are applied. It is assumed that pieces of image frame information on left and right sides are pieces of information captured by different cameras that do not overlap each other (that captured zones are spaced apart from each other). When an object indicated by a symbol X1 in the image frame information on the left side is the object of interest, the method for tracking an object of interest according to the present invention may be implemented by detecting a symbol X2, which indicates an object determined as the same object as the object having the symbol X1, from the image frame information on the right side through an object re-coloring process, after the object of interest disappears from a succeeding image frame on the left side.

In the same manner, according to the method and system for tracking an object of interest of the present invention, an object of interest can be tracked in real-time on the basis of mutually captured image data even though capturing zones of a plurality of cameras capable of performing data communication according to the connection therebetween do not overlap each other.

In the method for tracking the object of interest described in the present invention, exemplary modules, logic blocks, operations, or a combination thereof may be implemented by electronic hardware (a digital design designed by coding and the like), software (various types of applications including program instructions), or a combination thereof. Among hardware and software manners, the manner of implementing the exemplary modules, the logic blocks, the operations, or the combination thereof may vary according to design constraints imposed on a user terminal.

In some embodiments, one or more of the configurations described herein may be stored in a memory as computer program instructions, and the method described herein may be implemented by the computer program instructions using a digital signal processor. Examples of the connections between the components specified with reference to the drawings attached to this specification are only exemplary, and at least some of the examples may be omitted or, conversely, may include additional components as well as the above components.

The exemplary modules, the logic blocks, the operations, or a combination thereof according to the embodiments described herein may be implemented by electronic hardware (a digital design designed by coding and the like), software (various types of applications including program instructions), or a combination thereof. Among hardware and software manners, the manner of implementing the exemplary modules, the logic blocks, the operations, or the combination thereof may vary according to design constraints imposed on a user terminal.

While the present invention has been particularly described with reference to exemplary embodiments, it should be understood by those skilled in the art that various changes in form and details may be made thereto without departing from the spirit and scope of the present invention. Therefore, the exemplary embodiments should be considered in a descriptive sense only and not for purposes of limitation. The scope of the present invention is defined not by the detailed description of the present invention but by the appended claims and encompasses all modifications and equivalents that fall within the scope of the appended claims.

INDUSTRIAL APPLICABILITY

The present invention may be used for intelligent closed-circuit television (CCTV) technology or smart remote security technology in which an object can be tracked in a single-camera environment and in a multi-camera environment.

The invention claimed is:

1. A method for tracking an object of interest in a multi-camera environment, the method comprising:
    selecting, by a server module, a subnetwork in the multi-camera environment;
    receiving, by a client module, subnetwork configuration information from the server module;
    receiving, by the client module, image frames from one or more cameras constituting the subnetwork in a first time interval;
    determining a camera in which an object of interest is present on the basis of the received image frames and locally tracking the object of interest for the image frame from the determined camera;
    re-identifying the object of interest of the one or more cameras constituting the subnetwork when the object of interest disappears from the image frame of the determined camera;
    generating, by the client module, global object tracking information and multi-camera tracking result data for the object of interest on the basis of local path tracking information, multi-camera topology information, and interest object similarity information; and
    resetting, by the server module, the subnetwork around a camera that has re-identified the object of interest on the basis of the global object tracking information and the multi-camera tracking result data.

2. The method of claim 1, wherein the subnetwork configuration information includes an identifier (ID) of the object of interest and a camera index.

3. The method of claim 2, wherein the subnetwork includes one or more cameras neighboring a reference camera in which the ID of the object of interest is expected to be present.

4. The method of claim 1, wherein the local tracking of the object of interest includes tracking the object of interest in a second time interval from a time when the object of interest is present on the basis of an image frame received from a first camera constituting the subnetwork and generating the local path tracking information (tracklet) and interest object result information (region of interest (ROI) information).

5. The method of claim 1, further comprising re-identifying the object of interest by comparing image frames from a first camera and a second camera constituting the subnetwork on the basis of the local path tracking information and interest object result information.

6. The method of claim 5, further comprising:
    associating image frames from the one or more cameras constituting the subnetwork with data on the basis of the local path tracking information, the multi-camera topology information, and the interest object similarity information when the object of interest is re-identified; and
    generating multi-camera tracking result data by associating the data and transmitting the multi-camera tracking result data to the server module.

7. A non-transitory computer readable storage media recording a computer program for executing the method according to claim 1.

8. A system for tracking an object of interest in a multi-camera environment, the system comprising:
    a plurality of cameras configured to capture different zones;
    a server module configured to select a subnetwork of the plurality of cameras; and
    one or more client modules configured to perform data communication with the server module and the plurality of cameras, receive image frames from one or more cameras constituting the subnetwork in a first time interval, detect an object of interest, and track the object of interest,
    wherein the one or more client modules are configured to generate global object tracking information and multi-camera tracking result data for the object of interest on the basis of local path tracking information, multi-camera topology information, and interest object similarity information, and
    wherein the server module is configured to reset the subnetwork around a camera that has re-identified the object of interest on the basis of the global object tracking information and the multi-camera tracking result data.

9. The system of claim 8, wherein the server module resets the subnetwork on the basis of the global object tracking information, multi-camera tracking result information, and the multi-camera topology information.

10. The system of claim 9, wherein the one or more client modules are configured to:
    determine whether the object of interest is present in an image frame received from a first camera and generate the local path tracking information and interest object result information in a second time interval from a time when the object of interest is present on the basis of the image frame received from the first camera;
    re-identify the object of interest by comparing image frames from the first camera and a second camera constituting the subnetwork on the basis of the local path tracking information and the interest object result information; and
    associate the image frames from the one or more cameras constituting the subnetwork with data on the basis of the local path tracking information, the multi-camera topology information, and the interest object similarity information when the object of interest is re-identified.

* * * * *